US012073251B2

(12) United States Patent
Challapalle et al.

(10) Patent No.: US 12,073,251 B2
(45) Date of Patent: Aug. 27, 2024

(54) OFFLOADING COMPUTATIONS FROM A PROCESSOR TO REMOTE EXECUTION LOGIC

(71) Applicant: ADVANCED MICRO DEVICES, INC., Santa Clara, CA (US)

(72) Inventors: Nagadastagiri Reddy Challapalle, State College, PA (US); Jagadish B. Kotra, Austin, TX (US); John Kalamatianos, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 902 days.

(21) Appl. No.: 17/136,767

(22) Filed: Dec. 29, 2020

(65) Prior Publication Data

US 2022/0206855 A1    Jun. 30, 2022

(51) Int. Cl.
*G06F 9/50* (2006.01)
(52) U.S. Cl.
CPC .................................. *G06F 9/5027* (2013.01)
(58) Field of Classification Search
None
See application file for complete search history.

(56) References Cited

U.S. PATENT DOCUMENTS

| 5,903,916 | A | 5/1999 | Pawlowski et al. |
| 6,553,465 | B1 | 4/2003 | Takusagawa |
| 6,601,153 | B1 | 7/2003 | Engelbrecht et al. |
| 6,944,746 | B2 | 9/2005 | So |
| 6,973,541 | B1 | 12/2005 | Williams et al. |
| 7,047,393 | B2 | 5/2006 | Paver et al. |
| 8,359,462 | B1 | 1/2013 | Khan et al. |
| 9,348,539 | B1 | 5/2016 | Saxena et al. |
| 10,061,588 | B2 * | 8/2018 | Gschwind ............ G06F 9/30076 |
| 10,282,292 | B2 | 5/2019 | Prodromou et al. |
| 11,355,170 | B1 | 6/2022 | Yudanov |
| 11,594,274 | B2 * | 2/2023 | Murphy .............. G11C 11/4091 |

(Continued)

FOREIGN PATENT DOCUMENTS

| WO | 2014120193 A1 | 8/2014 |
| WO | 2021028723 A2 | 2/2021 |

(Continued)

OTHER PUBLICATIONS

Lee et al.; "Design of Processing-"Inside"-Memory Optimized for DRAM Behaviors"; Digital Object Identifier 10.1109/ACCESS. 2019.2924240; Korea University, Jul. 9, 2019; (Lee_2019.pdf; pp. 1-16) (Year: 2019).*

(Continued)

*Primary Examiner* — Hiren P Patel

(57) ABSTRACT

Offloading computations from a processor to remote execution logic is disclosed. Offload instructions for remote execution on a remote device are dispatched in the form of processor instructions like conventional instructions. In the processor, an offload instruction is inserted in an offload queue. The offload instruction may be inserted at the dispatch stage or the retire stage of the processor pipeline. Metadata for the offload instruction is added to the offload instruction in the offload queue. After retirement of the offload instruction, the processor transmits an offload request generated from the offload instruction.

20 Claims, 5 Drawing Sheets

(56) References Cited

U.S. PATENT DOCUMENTS

| | | | |
|---|---|---|---|
| 11,625,249 B2* | 4/2023 | Kotra | G06F 9/3887 |
| | | | 712/214 |
| 11,663,008 B2* | 5/2023 | Lee | G11C 7/1006 |
| | | | 712/208 |
| 11,868,777 B2* | 1/2024 | Kalamatianos | G06F 9/3001 |
| 2005/0015538 A1 | 1/2005 | Van't Wout et al. | |
| 2005/0246698 A1 | 11/2005 | Chung | |
| 2008/0046692 A1 | 2/2008 | Michalak et al. | |
| 2012/0159077 A1 | 6/2012 | Steely, Jr. et al. | |
| 2013/0086367 A1* | 4/2013 | Gschwind | G06F 9/30127 |
| | | | 712/E9.016 |
| 2014/0281405 A1* | 9/2014 | Streett | G06F 9/3842 |
| | | | 712/216 |
| 2016/0155491 A1* | 6/2016 | Roberts | G11C 11/40607 |
| | | | 711/106 |
| 2017/0060588 A1* | 3/2017 | Choi | G06F 15/80 |
| 2017/0123987 A1* | 5/2017 | Cheng | G06F 15/7821 |
| 2017/0344480 A1* | 11/2017 | Beard | G06F 12/0815 |
| 2018/0089081 A1 | 3/2018 | Ramalingam | |
| 2018/0188961 A1 | 7/2018 | Venkatesh et al. | |
| 2018/0336035 A1 | 11/2018 | Choi et al. | |
| 2019/0138313 A1 | 5/2019 | Lin | |
| 2019/0377580 A1 | 12/2019 | Vorbach et al. | |
| 2020/0035291 A1 | 1/2020 | Kasibhatla et al. | |
| 2020/0174931 A1 | 6/2020 | Williams et al. | |
| 2020/0192757 A1* | 6/2020 | Qin | G06F 11/1076 |
| 2020/0218540 A1* | 7/2020 | Kesiraju | G06F 9/3816 |
| 2021/0271680 A1* | 9/2021 | Lee | G06F 9/544 |
| 2021/0349826 A1 | 11/2021 | Roy et al. | |
| 2022/0076717 A1* | 3/2022 | Mathew | G06F 3/061 |
| 2022/0156081 A1 | 5/2022 | Seo et al. | |
| 2022/0188117 A1 | 6/2022 | Kalamatianos et al. | |
| 2022/0188233 A1 | 6/2022 | Kalamatianos et al. | |
| 2022/0206817 A1 | 6/2022 | Kotra et al. | |
| 2022/0237041 A1 | 7/2022 | Lee et al. | |
| 2022/0292033 A1 | 9/2022 | Yu et al. | |
| 2023/0205693 A1 | 6/2023 | Kotra et al. | |

FOREIGN PATENT DOCUMENTS

| | | |
|---|---|---|
| WO | 2022132795 A1 | 6/2022 |
| WO | 2022146793 A1 | 7/2022 |

OTHER PUBLICATIONS

Ahn et al.; "PIM-Enabled Instructions: A Low-Overhead, Locality-Aware Processing-in-Memory Architecture"; Seoul National University; DOI: http://dx.doi.org/10.1145/2749469.2750385; 2015 ACM; (Ahn_2015.pdf; pp. 336-348) (Year: 2015).*

Ghose et al.; "Processing-in-memory: A workload-driven perspective"; Copyright 2019 by International Business Machines Corporation; Digital Object Identifier: 10.1147/JRD.2019.2934048; (Ghose_2019.pdf; pp. 1-19) (Year: 2019).*

Kim et al.; "Exploration of a PIM Design Configuration for Energy-Efficient Task Offloading"; Inha University, Korea; 2019 IEEE; (Kim_2019.pdf; pp. 1-4) (Year: 2019).*

Pattnaik et al.; "Scheduling Techniques for GPU Architectures with Processing-In-Memory Capabilities"; DOI: http://dx.doi.org/10.1145/2967938.2967940; PACT '16, Sep. 11-15, 2016, Haifa, Israel; 2016 ACM (Pattnaik_2016.pdf; pp. 31-44) (Year: 2016).*

Nai et al.; "GraphPIM: Enabling Instruction-Level PIM Offloading in Graph Computing Frameworks"; 2017 IEEE International Symposium on High Performance Computer Architecture; (NPL: Nai_2017.pdf; pp. 457-465) (Year: 2017).*

Xu et al.; "TUPIM: A Transparent and Universal Processing-in-Memory Architecture for Unmodified Binaries"; GLSVLSI '20, Sep. 7-9, 2020, Virtual Event, China; 2020 Association for Computing Machinery (NPL: Xu_2020.pdf; pp. 199-204) (Year: 2020).*

International Search Report and Written Opinion, PCT/US2022/052886, Mar. 20, 2023, 11 pages.

Santos et al., "Processing in 3D memories to speed up operations on complex data structures," 2018 Design, Automation & Test in Europe Conference & Exhibition (DATE), Date of Conference: Mar. 19-23, 2018, Dresden, Germany, DOI: 10.23919/DATE.2018.8342135, Date Added to IEEE Xplore: Apr. 23, 2018, 4 pages.

Aga et al., "Co-ML: A Case for Collaborative ML Acceleration using Near-Data Processing", MemSys '19: Proceedings of the International Symposium on Memory Systems, DOI: 10.1145/3357526.3357532, dated Sep. 2019, 12 pages.

Boroumand et al., "LazyPIM: Efficient Support for Cache Coherence in Processing-in-Memory Architectures", IEEE Computer Architecture Letters, vol. 16, Issue 1, DOI:10.1109/LCA.2016.2577557, dated Jun. 2016, 12 pages.

Denby et al., "Orbital Edge Computing: Nanosatellite Constellations as a New Class of Computer System", Proceedings of the Twenty-Fifth International Conference on Architectural Support for Programming Languages and Operating Systems (ASPLOS '20), Mar. 2020, pp. 939-954, IEEE, United States, URL: https://doi.org/10.1145/3373376.3378473.

Farmahini-Farahani et al., "NDA: Near-DRAM Acceleration Architecture Leveraging Commodity DRAM Devices and Standard Memory Modules", 2015 IEEE 21st International Symposium on High Performance Computer Architecture (HPCA), DOI: 10.1109/HPCA.2015.7056040, dated Mar. 2015, 13 pages.

Gao et al., "ComputeDRAM: In-Memory Compute Using Off-the-Shelf DRAMs", Proceedings of the 52nd Annual IEEE/ACM International Symposium on Microarchitecture (MICRO '52), Oct. 2019, pp. 100-113, IEEE, URL: https://doi.org/10.1145/3352460.3358260.

Ghose et al., "A Workload and Programming Ease Driven Perspective of Processing-in-Memory", IBM Journal of Research & Development, vol. 63, Issue: 6, Nov. 2019, IBM, United States.

Ghose et al., "Enabling the Adoption of Processing-in-Memory: Challenges, Mechanisms", Future Research Directions, Carnegie Mellon University Invited Book Chapter, 45 pages, Feb. 2018, Cornell University (online: arXiv.org), URL: https://arxiv.org/pdf/1802.00320.pdf.

IBM Corporation, "dcbf (Data Cache Block Flush) instruction", IBM Documentation, URL: https://www.ibm.com/docs/en/aix/7.2?topic=set-dcbf-data-cache-block-flush-instruction, 2020, printed May 4, 2021, 3 pages.

IBM Corporation, dcbi (Data Cache Block Invalidate) instruction, IBM Documentation, URL: https://www.ibm.com/docs/en/aix/7.2?topic=set-dcbi-data-cache-block-invalidate-instruction, 2020, printed May 4, 2021, 3 pages.

Islam et al., "Improving Node-Level MapReduce Performance Using Processing-in-Memory Technologies", European Conference on Parallel Processing (Euro-Par 2014: Parallel Processing Workshops), pp. 425-437, Springer International Publishing, Switzerland.

Loh et al., "A Processing-in-Memory Taxonomy and a Case for Studying Fixed-function PIM", 3rd Workshop on Near- Data Processing, Dec. 2013, 4 pages, University of Utah.

Mutlu et al., "Enabling Practical Processing in and near Memory for Data-Intensive Computing", Proceedings of the 56th Annual Design Automation Conference (DAC '19), Jun. 2019, Article No. 21 pp. 1-4, https://doi.org/10.1145/3316781.3323476.

Mutlu et al., "Processing Data Where It Makes Sense: Enabling In-Memory Computation", Journal of Microprocessors and Microsystems, vol. 67, Jun. 2019, pp. 28-41, Elsevier B.V., Amsterdam, The Netherlands.

Nyasulu, "System Design for a Computational-RAM Login-In-Memory Parallel Processing Machine", PHD Thesis, May 1999, 196 pages, Carleton University, Ottawa, ON, Canada.

Pugsley et al., "Analyzing the Impact of 3D-stacked Memory+Logic Devices on MapReduce Workloads", 2014 IEEE International Symposium on Performance Analysis of Systems and Software (ISPASS), Mar. 2014, pp. 190-200, IEEE, United States.

Seshadri et al., "RowClone: Fast and Energy-Efficient In-DRAM Bulk Data Copy and Initialization", 2013 46th Annual IEEE/ACM International Symposium on Microarchitecture (MICRO), DOI:10.1145/2540708.2540725, dated Dec. 2013, 13 pages.

(56) References Cited

OTHER PUBLICATIONS

Singh et al., "A Review of Near-Memory Computing Architectures: Opportunities and Challenges", EuroMicro Conference on DSD, Aug. 2018, 10 pages, IEEE, United States, DOI: 10.1109/DSD.2018.00106.

Yang et al., "A Processing-in-Memory Architecture Programming Paradigm for Wireless Internet-of-Things", Applications, Sensors Journal, Jan. 2019, 23 pages, MDPI, Basel, Switzerland.

Kim et al., "Silent-PIM: Realizing the Processing-in-Memory Computing With Standard Memory Requests," IEEE Transactions on Parallel and Distributed Systems, Vo. 33, No. 2, Feb. 1, 2022, 12 pages.

Andi Kleen (andi@firstfloor.org), Memory Offlining, /sys/devices/system/memory/hard_offline_page, URL: https://www.kernel.org/doc/Documentation/ABI/testing/sysfs-memory-page-offline, dated Sep. 2009, 1 page.

International Search Report and Written Opinion, PCT/US2021/063345, Apr. 4, 2022, 9 pages.

International Search Report and Written Opinion, PCT/US2021/064663, May 10, 2022, 12 pages.

Jonathan Corbet, AutoNUMA: the other approach to NUMA scheduling, URL: https://lwn.net/Articles/488709/, dated Mar. 27, 2012, 5 pages.

Kwon et al., 25.4 A 20nm 6GB Function-In-Memory DRAM, Based on HBM2 with a 1.2TFLOPS Programmable Computing Unit Using Bank-Level Parallelism, for Machine Learning Applications, IEEE, 2021 IEEE International Solid-State Circuits Conference (ISSCC), URL: https://safari.ethz.ch/architecture_seminar/fall2021/lib/exe/fetch.php?media=kwon2021fimdram.pdf, DOI: 10.1109/ISSCC42613.2021.9365862, Date Added to IEEE Xplore: Mar. 3, 2021, 3 pages.

Nam Sung Kim, A Journey to a Commercial-Grade Processing-In-Memory (PIM) Chip Development, HPCA 2021, The 27th IEEE International Symposium on High-Performance Computer Architecture (PCA-27), Seoul, South Korea, URL: https://hpca-conf.org/2021/keynotes/, dated Mar. 3, 2021, 3 pages.

Ahn et al., "PIM-Enabled Instructions: A Low-Overhead, Locality-Aware Processing-in-Memory Architecture", 2015 ACM/IEEE 42nd Annual International Symposium on Computer Architecture (ISCA), Jun. 2015, 13 pages, IEEE, United States.

* cited by examiner

| ROB 210 | Thread ID 220 | Opcode 225 | Register 227 | PA 230 | PRN 240 | Operand 250 | Valid Bit 260 |

| Thread ID 320 | Opcode 325 | Register 327 | PA 330 | Operand 350 | Valid Bit 360 |

OFFLOADING COMPUTATIONS FROM A PROCESSOR TO REMOTE EXECUTION LOGIC

BACKGROUND

Computing systems often include a number of processing resources (e.g., one or more processors), which may retrieve and execute instructions and store the results of the executed instructions to a suitable location. A processing resource (e.g., central processing unit (CPU)) can comprise a number of functional units such as arithmetic logic unit (ALU) circuitry, floating point unit (FPU) circuitry, and/or a combinatorial logic block, for example, which can be used to execute instructions by performing logical operations on data (e.g., one or more operands). For example, functional unit circuitry may be used to perform arithmetic operations such as addition, subtraction, multiplication, and/or division on operands via a number of logical operations. Typically, the processing resources (e.g., processor and/or associated functional unit circuitry) may be external to a memory array, and data is accessed via a bus between the processing resources and the memory array to execute a set of instructions. To reduce the amount of accesses to fetch or store data in the memory array, computing systems may employ a cache hierarchy that temporarily stores recently accessed or modified data for use by a processing resource or a group of processing resources. However, processing performance may be further improved by offloading certain operations to a processor-in-memory (PIM) device, in which processing resources may be implemented internal and/or near to a memory, such that data processing is performed closer to the memory location storing the data rather than bringing the data closer to the processing resource. A PIM device may lower latency by reducing and/or eliminating communications with the host, exploit the higher memory bandwidth available inside each memory array and may also conserve power due to avoiding sending data back to the host.

Certain applications have phases of low or no temporal data reuse during which they frequently miss in the cache hierarchy and fetch data from memory. In addition, some of these phases may also exhibit low computational intensity (ratio of flops/byte). During those phases, energy efficiency and performance drops because data movement is high and the phase is memory bound (few computations for every byte fetched). Accordingly, these phases are particularly suited for offloading to a PIM device or accelerator. For example, the programmer can provide indications in the application source code that a particular code sequence should be offloaded, or the compiler may make such a determination. The interpretation and orchestration of offloaded instructions must still be performed by the processing resource(s) hosting the application.

DETAILED DESCRIPTION

Figure 1:
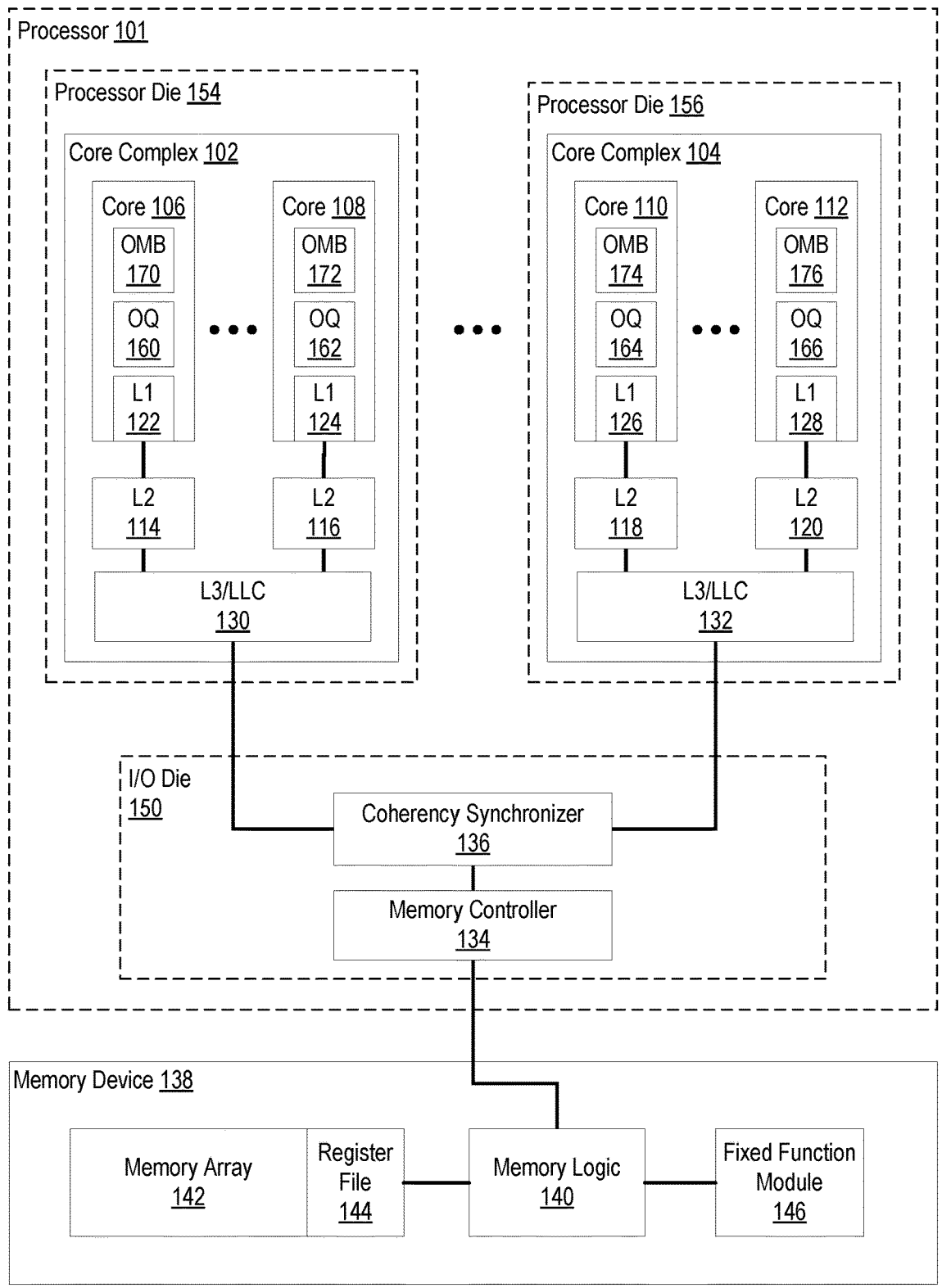
FIG. 1 sets forth a block diagram of an example system for offloading computations from a processor to remote execution logic according to embodiments of the present disclosure.

To reduce the latency of waiting for memory operands and overall data movement, certain operations may be offloaded from central processing units (CPU) cores for remote execution to a target device, such as a Processing-in-Memory (PIM) device or an accelerator. For example, PIM architectures support offloading instructions for execution in or near memory, such that additional memory bandwidth, available only inside memory can be exploited and power consumption due to data movement between the processor and memory may be reduced. Execution of offloaded instructions by, for example, a PIM device do not require loading data into local CPU registers and writing data from local CPU storage back to the memory.

Some examples of a PIM architectures consider programmable hardware available in the form of in-order, out-of-order CPU cores, programmable address generation engines, GPUs, custom accelerators, etc., with PIM hardware located either in the logic layer of 3D-stacked memory or inside the dual in-line memory module (DIMM) of 2D-attached double data rate (DDRx) memory. Launching memory bound phases of applications to those cores requires changes to the threading model, hardware support to transfer machine state from the main core to the PIM hardware and vice versa. This complicates and delays transition from the main thread to the PIM thread and vice versa.

Some examples of a PIM architecture use dedicated engines for accelerating specific code idioms such as graph traversals (by generating addresses of dependent loads). These engines also need to be multithreaded (to support the graph traversals across multiple threads) and in-order. Offloading code to those engines requires support for scalar instruction execution as well which increases their complexity. In these examples, such PIM solutions assume accessing non-coherent PIM data by copying entire data structures from cacheable to non-cacheable part of the physical address space.

In one example, where PIM instructions are dispatched by the CPU core, PIM instructions are selectively offloaded based on cache locality. More specifically, these PIM instructions are executed on the CPU side (using dedicated execution units) if the data accessed by the PIM instructions are found in the cache hierarchy. Thus, this approach offloads instructions to the PIM device only in scenarios where the data locality is low. However, this also assumes dedicated hardware to execute PIM instructions inside the CPU core in parallel to the conventional CPU pipeline. In addition, this approach also requires extending the ISA with a whole new set of instructions (CPU core decoder modifications) that can be executed both on PIM and in the core (because these instructions may or may not be offloaded). Moreover, this approach requires synchronization of PIM instructions across CPU cores via a PIM directory, for example, resident in a PIM management hardware structure. Furthermore, in this approach, all PIM instructions must be executed atomically. Atomicity enforcement among these PIM instructions introduces delays because it requires round-trip communication between the CPU core and the PIM device.

Embodiments in accordance with the present disclosure provide hardware and instruction set architecture support in CPU cores, caches, and functional logic blocks that enables the offloading of computations to PIM devices or accelerators with fixed function capability. The hardware support requires no changes to the threading model of the original application and enables an application to perform fixed function computations on cacheable data without necessitating software cache management. Embodiments in accordance with the present disclosure reduce the complexity and overhead of offloading instructions by enabling instructions to be offloaded to a target device assuming cacheable, coherent data and without launching any additional threads. Particularly, embodiments in accordance with the present disclosure provide support for out-of-order, multiple issue CPU cores to offload computations to a target device such as a PIM device, accelerator, or other CPU-guided target device.

An embodiment in accordance with the present disclosure is directed to the method of offloading computations from a processor to remote execution logic. The method includes inserting an offload instruction in an offload queue, wherein the offload instruction is dispatched within a processor for offloaded execution on a remote device. The method also includes transmitting, after retirement of the offload instruction, an offload request generated from the offload instruction.

In some implementations, inserting an offload instruction in an offload queue includes inserting the offload instruction in the offload queue at a dispatch stage for the offload instruction. In some implementations, metadata is added to the offload instruction in the offload queue. In these implementations, adding metadata to the offload instruction in the offload queue may include, in response to determining that data for one or more operands are available for the offload instruction, adding operand data as metadata.

In some implementations, inserting an offload instruction in an offload queue includes inserting the offload instruction in the offload queue at a retire stage for the offload instruction. In these implementations, the method may also include, in response to determining that data for one or more operands are available for the offload instruction, storing operand data as metadata in a metadata buffer. In some implementations, metadata is added to the offload instruction in the offload queue. In these implementations, adding metadata to the offload instruction in the offload queue may include, in response to determining that the offload instruction is ready to retire, adding the metadata from the metadata buffer to the offload instruction in the offload queue.

In some examples, the metadata includes a memory address generated from a memory operand of the offload instruction. In some examples, the metadata includes a value for a source operand of the offload instruction that is computed by a non-offload instruction. In some examples, the remote device is a fixed-function processing-in-memory (PIM) device.

An embodiment in accordance with the present disclosure is directed to multicore processor for offloading computations from a processor to remote execution logic. The multicore processor embodies processor logic configured to insert an offload instruction in an offload queue, wherein the offload instruction is dispatched within a processor for offloaded execution on a remote device. The processor is also configured to transmit, after retirement of the offload instruction, an offload request generated from the offload instruction.

In some implementations, inserting an entry for an offload instruction in an offload queue includes creating the entry in the offload queue at a dispatch stage for the offload instruction. In some implementations, the processor is also configured to add metadata to the offload instruction in the offload queue. In these implementations, adding metadata to the offload instruction in the offload queue may include, in response to determining that data for one or more operands are available for the offload instruction, adding operand data as metadata.

In some implementations, inserting an offload instruction in an offload queue includes inserting the offload instruction in the offload queue at a retire stage for the offload instruction. In these implementations, the processor may be further configured to, in response to determining that data for one or more operands are available for the offload instruction, store operand data as metadata in a metadata buffer. In some implementations, the processor is also configured to add metadata to the offload instruction in the offload queue. In these implementations, adding metadata to the offload instruction in the offload queue may include, in response to determining that the offload instruction is ready to retire, adding the metadata from the metadata buffer to the offload instruction in the offload queue.

An embodiment in accordance with the present disclosure is directed to a system for offloading computations from a processor to remote execution logic. The system includes a processing-in-memory (PIM) device. The system also includes a multicore processor coupled to the PIM device. The processor embodies logic configured to insert an offload instruction in an offload queue, wherein the offload instruction is dispatched within a processor for offloaded execution on the PIM device. The processor is also configured to transmit, after retirement of the offload instruction, an offload request generated from the offload instruction.

In some implementations, inserting an offload instruction in an offload queue includes inserting the offload instruction in the offload queue at a dispatch stage for the offload instruction. In these implementations, the processor is also configured to add metadata to the offload instruction in the offload queue. In these implementations, adding metadata to the offload instruction in the offload queue may include, in response to determining that data for one or more operands are available for the offload instruction, adding operand data as metadata to the offload instruction in the offload queue.

In some implementations, inserting an offload instruction in an offload queue includes inserting the offload instruction in the offload queue at a retire stage for the offload instruction. In these implementations, the processor may be further configured to, in response to determining that data for one or more operands are available for the offload instruction, store operand data as metadata in a metadata buffer. In some implementations, the processor is also configured to add metadata to the offload instruction in the offload queue. In these implementations, adding metadata to the offload instruction in the offload queue may include, in response to determining that the offload instruction is ready to retire, adding the metadata from the metadata buffer to the offload instruction in the offload queue.

FIG. 1 sets for a block diagram illustrating an example system 100 for offloading computations from a processor to remote execution logic according to various embodiments of the present disclosure. In the example of FIG. 1, the system 100 includes a multicore processor 101 that includes multiple core complexes 102, 104. For example, the processor 101 may be implemented in a system-on-chip (SoC) architecture. In the example depicted in FIG. 1, each core complex 102, 104 includes multiple processor cores 106, 108, 110, 112 (e.g., central processing unit (CPU) cores, graphical processing unit (GPU) cores, etc.) respectively coupled to second-level (L2) caches 114, 116, 118, 120. Further, each of the processor cores 106, 108, 110, 112 includes respective primary (L1) caches 122, 124, 126, 128. Each of the processor cores 106, 108, 110, 112 includes various components of a processor pipeline (not depicted) such as an instruction fetch, decode, and dispatch pipeline, prefetch input queues, schedulers, load/store queues, lookaside buffers, reorder buffers, and retire queues as well as various arithmetic logic units (ALUs) and register files.

The configuration of the example system 100 depicted in FIG. 1 is presented for the purpose of explanation. Readers will appreciate that, while four processor cores 106, 108, 110, 112 are depicted in FIG. 1, the processor 101 may include more or fewer processor cores than depicted, as well as more or fewer core complexes, as well as more or fewer caches.

In the example depicted in in FIG. 1, each core complex 102, 104 includes a third level (L3) cache 130, 132 that serves as an interconnect cache, or last level cache (LLC), that connects all of the L2 caches of a particular core complex. In some examples, the processor 101 is configured to execute multithreaded applications using the multiple processor cores 106, 108, 110, 112. In these examples, a modification of data in a cache in one core complex 102 may affect the validity of data cached in another core complex 104. To enforce cache coherency, the processor 101 may include a coherency synchronizer 136 coupled to each L3 cache 130, 132 of the core complexes 102, 104. In these examples, the coherency synchronizer 136 initiates cache operations, for example, by transmitting cache probes to invalidate or flush data contained in cache entries of any L1, L2, or L3 cache present in the processor 101.

Each L1, L2, and L3 cache includes cache logic that, in response to a processor request, determines whether data associated with a requested operation is present in a cache entry of the cache. If the data is present (a 'cache hit'), the processor request is fulfilled using the data present in the cache entry. If the data is not present (a 'cache miss'), the request is forwarded to the next-level cache until a cache miss is detected in the LLC. In response to a cache miss in the LLC, the cache is forwarded to a memory controller 134 of the processor 101 to fulfill the request using data stored in main memory (e.g., memory device 138). In one example, the processor requests are I/O operations, such as read/write requests, directed to a memory location in the memory device 138.

Each of the processor cores 106, 108, 110, 112 executes machine language code created by a compiler system (e.g., GNU Compiler Collection (GCC)) from an application that executes on the processor 101. For example, the application may be a single-threaded or multithreaded application. The processor cores implement an instruction set architecture (ISA) utilized by the compiler system for generating the machine language code. In one example, the ISA for the processor 101 is the x86-64 instruction set with support for advance vector extension such as AVX-256.

In accordance with various embodiments of the present disclosure, the processor 101 implements an extended ISA for processing offload instructions for execution by an offload target device. For example, the offload target device may be a remote component that implements fixed functions, such as a processing-in-memory (PIM) device or an accelerator, as described in more detail below. The offload target device is a remote component in that execution logic for executing the offload instructions is not part of any processor core. For example, the offload target device may be implemented on the same chip or in the same package as the processor cores 106, 108, 110, 112 while remaining "remote" from the processor 101. In some implementations, the extended ISA is the extended ISA described in in co-pending U.S. patent application Ser. No. 17/123,270 filed Dec. 16, 2020. In such an extended ISA, a remote_load instruction opcode loads data of a memory operand from main memory into a local register of the offload target device, while a remote_store instruction opcode writes data from a local register of the offload target device to a memory operand in main memory. A remote_op instruction opcode in the extended ISA can represent any arithmetic or logical operation supported by the target device's fixed function architecture. None of the operations modifies control flow and thus all offloaded instructions are executed in sequence. The remote_op instruction source operands can be (a) a memory address (specified in the same way as in the baseline ISA), (b) an architectural register (from the CPU core standard ISA), or (c) an offload target register implemented in the offload target device. In some implementations, an offload instruction destination operand can only be an offload target register. The offload target registers are architected registers within the extended ISA that represent registers local to the offload target fixed function logic and are allocated by the compiler. The offload target registers in the extended ISA are virtual registers in that they have no physical storage in the processor core, and are used to support data dependencies between offload instructions and to track offload target register usage at the memory controller 134 when the offload requests are sent to an offload target device.

In some implementations, the remote_load instruction includes a destination operand that is an offload target register and a source operand that is an architectural register that is used to generate a memory address. The remote_load instruction indicates that the offload target device should load data from the memory location identified by the memory address into the offload target register. In the case where the offload target is a PIM device, the remote_load instruction indicates that the PIM device should load the data from the memory location identified by the memory address into a PIM register, as explained in detail below.

In some implementations, the remote_store instruction includes a destination operand that is a memory address, a source operand that is an architectural register used to generate the memory address, and a source operand that is an offload target register. The remote_store instruction indicates that the offload target device should store data from the offload target register to a memory location identified by the memory address. In the case where the offload target device is a PIM device, the remote_store instruction indicates that the PIM device should store data from the target register in the memory location in the PIM device identified by the physical memory address, as explained in detail below.

In some implementations, the remote_op instruction includes a destination operand that is an offload target register and source operands for a computation, where the source operands may be architectural registers (carrying values from prior non-offloaded computations), offload target registers or a memory address (generated by an architectural register also specified in the remote_op instruction). The remote_op instruction indicates that fixed function logic in the offload target device should perform the computation and place the result in the offload target register indicated by the destination operand. In the case where the offload target device is a PIM device, the remote_op instruction indicates that the PIM device should perform a function within the memory logic of the PIM device, as explained in detail below.

In some implementations, the offload instructions are generated by the compiler at application compile time using the extended ISA. In one example, the compiler identifies offload instructions in source code based on indications in application source code provided by the programmer, for example, using an API for offloading. In another example, the compiler identifies instruction for offloading based on a determination that the instructions are suitable for offloading. The offload instructions may be identified as a region of interest (ROI) in the source code. Each dynamic instance of an ROI in the source code may be identified as an offload transaction that includes one or more offload instructions. For example, an offload transaction may include remote_load instruction, one or more remote_op instructions, and a remote_store instruction. An offload transaction can be a loop iteration or a subroutine or a subset of subroutine's body. The offload transaction is a sequential piece of code and does not include any control flow changing instructions. In some examples, special instructions can mark the beginning and end of each offload transaction.

In some implementations, an offload instruction is fetched, decoded, and dispatched (e.g., by the front-end pipeline of the core), as would be performed for any typical non-offload instruction. After the offload instruction is dispatched and once the offload instruction has been picked by a scheduler, core resources are used to generate virtual and/or physical addresses for any memory locations identified in the offload instruction (e.g., in remote_load, remote_store and remote_op instructions that have a memory operand) and any values consumed by offload instructions from physical, non-offload registers (e.g., computed from non-offload instructions). After the virtual and/or physical addresses have been generated and the values from core registers are available, an offload instruction is ready to retire. Even though offload instructions are picked by a scheduler, these instructions do not execute any operations in the core's ALUs (vector or scalar, integer or floating point), neither do they modify machine state when issued by the core, including architected registers and flags as defined in the core's standard ISA. Offload instructions are ready to retire as soon as they have completed the operations (address generation and/or reading values computed by non-offload instructions) mentioned above without violating memory ordering. In the event of pipeline flushing (e.g., due to branch mispredictions, load-store forwarding data dependence violations, interrupts, traps, etc.), the offload instructions can be flushed like conventional instructions because they occupy instruction window entries like non-offload instructions. Further, because remote_op instructions do not execute on the core's ALUs, no arithmetic error traps are detected for them. However, other traps (e.g., for virtual or physical address generation, instruction breakpoints, etc.) generated by offload instructions are detected and served inside the core pipeline with the same mechanisms used for non-offload instructions.

Once the offload instructions retire, the generated memory addresses and values of any architectural register source operands are included in an offload request generated for the offload instruction. The offload request includes the offload target register as well as any generated memory address or register values need to complete the offload instruction and store the result in the offload target register. In some implementations, each core includes an offload queue 160, 162, 164, 166 that maintains entries for offload instructions (e.g., a first-in-first-out queue). The offload queue 160, 162, 164, 166 is utilized in generating offload requests based on the programmatic sequence of the offload instructions as they retire. There may be one offload queue 160, 162, 164, 166 per thread if the core supports multithreading. Each offload request is dispatched to the offload target device in program order by the core at retire time to be executed in the same program order remotely in the offload target device.

In some embodiments, entries for offload instructions are added to the offload queue 160, 162, 164, 166 in the dispatch stage of the core's pipeline. When offload instructions are dispatched, an entry of the offload instruction is created in the offload queue 160, 162, 164, 166 of the core. However, at the dispatch stage, no memory addresses for source memory operands of remote_load and remote_store instructions are available until the memory addresses have been generated (as with conventional load and store instructions). In addition, not all source operands of offload instructions, computed from non-offload instructions into architected core registers, may be ready in the physical register file. This metadata (i.e., data from the physical register file and computed memory addresses) must be added to the offload queue 160, 162, 164, 166 when they become available at a later pipeline stage. An offload queue identifier may be used as an index for the offload queue 160, 162, 164, 166. In some examples, a reorder buffer identifier (ROB ID) is used as the offload queue identifier so that source operands are copied to the correct offload queue entry as the source operands become available. The ROB IDs are assigned at the instruction dispatch stage to all instructions (offload and non-offload) by the core dispatch logic and they uniquely represent a dynamic instruction during the instruction's lifetime in the core pipeline until retirement.

Figure 2:
FIG. 2 sets for an example schema for an offload queue entry for offloading computations from a processor to remote execution logic according to embodiments of the present disclosure.

For further explanation, FIG. 2 sets forth an example schema for an offload queue entry 200 for offloading computations from a processor to remote execution logic according to embodiments of the present disclosure. The example offload queue entry 200 includes an ROB ID field 210 that contains the ROB ID. A content addressable memory (CAM) may be employed to search the entire offload queue for a matching ROB ID. The ROB ID is copied to the ROB ID field 210 at the creation of the offload queue entry.

The example offload queue entry 200 also includes thread identifier field 220 that contains the thread identifier of the thread executing the offload instruction. The thread identifier is populated in the thread identifier field 220 at the creation of the offload queue entry.

The example offload queue entry 200 also includes an opcode field 225 for the opcode of the offload instruction. The opcode is populated in the opcode field 225 from the offload instruction at the creation of the offload queue entry. The example offload queue entry 200 also includes a remote register operand field 227 (e.g., as a destination operand of a remote_load or remote_op instruction or a source operand of a remote_store or remote_op instruction). The remote register (i.e., offload target register) is populated in the remote register operand field 227 from the offload instruction at the creation of the offload queue entry.

The example offload queue entry 200 also includes a physical address (PA) field 230. For a remote_load instruction, the PA field 230 contains the source memory address that is loaded into the remote register identified in the remote_load instruction. For a remote_store instruction, the PA field 230 contains the destination memory address to which data in the remote register identified in the remote_load instruction is written. For a remote_op instruction, the PA field 230 is populated with the PA of the last remote_load or remote_store in the transaction, even if the remote_op instruction does not have a memory operand. This is required to ensure the offload request from the remote_op instruction is routed to the correct memory channel and PIM device. The PA is copied to the PA field 230 from the address generation unit when it becomes available.

The example offload queue entry 200 may include a physical register number (PRN) field 240 that contains the register number to which the architected register of a source operand is mapped. The PRN of source operands is known at instruction dispatch, thus the PRN field 240 is populated at the creation of the offload queue entry. A content addressable memory (CAM) may be employed to search the entire offload queue for a matching PRN field 240. An offload queue entry for a remote_load or remote_store instruction may not have a value in the PRN field 240.

The example offload queue entry 200 also includes an operand field 250 that is populated with operand data of the physical register pointed to by the PRN field 240. For example, the operand data may be copied to the operand field 250 using the PRN field 240 if the operand is already available in the physical register file at instruction dispatch. Otherwise, operand data is copied to the operand field 250 when it becomes available, e.g., when the result of an older non-offload instruction is stored in the physical register file mapped to the PRN stored in the PRN field 240. A content addressable memory (CAM) may be employed to search the entire offload queue for a matching PRN field 240 when the result of an older non-offload instruction becomes available. An offload queue entry for a remote_load or remote_store instruction may not have a value in the operand field 250.

The example offload queue entry 200 also includes a valid bit field 260. If the entry 200 is active (i.e., an offload request for the corresponding offload request has not been transmitted), the valid bit is set to '1'; otherwise, the bit in the valid bit field 260 is set to '0' and thus the entry may be cleared.

In some implementations, the physical addresses of remote_load and remote_store instructions are added to the PA field 230 of the offload queue entries when the corresponding address translation is complete. The ROB ID is used as a unique identifier so that each physical address is copied to the correct offload queue entry. Similarly, the source operand values of remote_op instructions are added to the offload queue entry either by reading the physical register file if the operand is available by the time the remote_op instruction is dispatched to the back end of the core, or by forwarding the operand value from the reservation stations after execution of the producer, non-offload instruction. The PRN or the ROB ID may be used as unique identifiers so that each operand is copied to the correct offload queue entry. Because the PRN of source operands is known at dispatch stage, offload queue entries are updated with the PRN of the source operands at the dispatch stage. Given that some source operands do not need to be sent to the offload target device (e.g., because they only participate in address generation), only the PRNs corresponding to source operands participating in the remote computation are copied to the offload queue.

In some examples, during the execution stage, when an ALU forwards the operand value with its PRN to the reservation stations, it also forwards the PRN and the operand value to the offload queue. All offload queue entries matching the PRN update their source operand field 250 with the broadcasted value. In other examples, broadcasting of the operand value to the offload queue is initiated, not by the execution of the non-offload instruction that generates the operand value in destination operand, but when scheduling the remote_op instruction that consumes it as a source. This occurs when the remote_op instruction is picked by the instruction scheduler. As previously described, remote_op instructions get picked for execution even though they do not occupy ALU bandwidth and do not execute any operation in the core. Picking remote_op instructions serves as a mechanism to broadcast their ready source operand values (that reside in reservation stations) to the offload queue. In these examples, the ROB ID available in the reservation station entry may be used to search the offload queue; as such, in these examples, the PRN does not need to be included in each offload queue entry.

Because offload instruction entries are inserted in the offload queue at dispatch, mis-speculations that flush the pipeline may need to flush the offload queue also, either partially or fully. In some examples, this is accomplished using the ROB ID CAM where the offload queue entries with a ROB ID greater than or equal to the offending ROB ID (i.e., offload queue entries representing instructions younger than the offending instruction's ROB ID) are invalidated. The process may be similar to the behavior of other queues (e.g., load/store queues, instruction schedulers, etc.).

Returning to FIG. 1, in some embodiments, entries for offload instructions are added to the offload queue 160, 162, 164, 166 in the retire stage of the core's pipeline. In some implementations, offload instruction entries are added to the offload queue when they are ready to retire. Because metadata (physical addresses, operand values, etc.) that are generated for offload instructions is created during the execution stage, prior to the creation of the entry for the offload instruction in the offload queue, this metadata is temporarily stored in an offload metadata buffer (OMB) 170, 172, 174, 176. That is, the offload metadata buffer 170, 172, 174, 176 temporarily stores the metadata of each offload instruction until the retire stage. In some examples, the offload metadata buffer 170, 172, 174, 176 uses a CAM that will be accessed using the ROB ID of offload instructions. In these examples, source operand values may be added to the offload metadata buffer 170, 172, 174, 176 from the physical register file at dispatch stage (if the source operand is ready) using, for example, the ROB ID assigned to the offload instruction. Source operand values that are calculated by producer, non-offload instructions after an offload instruction has been dispatched are broadcasted to the offload metadata buffer 170, 172, 174, 176 when the offload instruction is picked for execution from the reservation stations. The broadcasting operation may use the ROB ID or the PRN of the operand. For remote_load and remote_store instructions, physical addresses are added (e.g., using the ROB ID) to the offload metadata buffer 170, 172, 174, 176 after address translation.

In some examples, the offload metadata buffer 170, 172, 174, 176 contents are fully or partially flushed in the event of a pipeline flush, in the same manner as the offload queue entries are flushed in the event of a pipeline flush when they are populated at dispatch stage. Because the offload metadata buffer 170, 172, 174, 176 entries are populated during execution time, its entries may be out of program order in a core that supports out of order execution.

In some implementations, when offload instructions are ready to retire, their opcode and thread identifier are copied from the ROB to the offload queue in program order (oldest instruction first). In addition, the ROB ID (provided by the ROB) is used to identify metadata in the offload metadata buffer 170, 172, 174, 176 corresponding to the offload instruction, and the metadata is copied from the offload metadata buffer 170, 172, 174, 176 to the entry for the offload instruction in the offload instruction queue. In this implementation, because the metadata is added to the offload queue entry at instruction retire, the offload queue entry does not need to have a CAM or store the ROB ID in its entries. Further, the offload queue does not need to be flushed because it is populated at retire time.

Figure 3:
FIG. 3 sets forth another example schema for an offload queue entry for offloading computations from a processor to remote execution logic in accordance with embodiments of the present disclosure.

For further explanation, FIG. 3 sets forth an example schema for an offload queue entry 300 for offloading computations from a processor to remote execution logic according to embodiments of the present disclosure. The example offload queue entry 300 includes thread identifier field 320 that contains the thread identifier of the thread executing the offload instruction. The thread identifier is copied to the thread identifier field 320 from the reorder buffer at the creation of the offload queue entry upon retirement of the offload instruction.

The example offload queue entry 300 includes an opcode field 325 for the opcode of the offload instruction. The opcode is copied to the opcode field 325 from the reorder buffer at the creation of the offload queue entry upon retirement of the offload instruction. The example offload queue entry 300 also includes a remote register operand field 327 (e.g., as a destination operand of a remote_load or remote_op instruction or a source operand of a remote_store or remote_op instruction). The remote register (i.e., offload target register) is copied to the remote register operand field 327 from the reorder buffer at the creation of the offload queue entry upon retirement of the offload instruction.

The example offload queue entry 300 also includes a physical address (PA) field 330. For a remote_load instruction, the PA field 330 contains the source memory address from which data is loaded into the remote register identified in the remote_load instruction. For a remote_store instruction, the PA field 330 contains the destination memory address to which data in the remote register identified in the remote_load instruction is written. For a remote_op instruction, the PA field 330 may be copied by a previous remote_load or remote_store instruction or may include the source memory address from which data is read. The PA is copied to the PA field 330 from the metadata buffer 170, 172, 174, 176 upon retirement of the offload instruction.

The example offload queue entry 300 also includes an operand field 350 that is populated with a source operand value produced by an older non-offload instruction that was copied to the metadata buffer 170, 172, 174, 176 during the execution stage. The source operand value is copied to the operand field 350 from the metadata buffer 170, 172, 174, 176 upon retirement of the offload instruction.

The example offload queue entry 300 also includes a valid bit field 360. If the entry 300 is active (i.e., an offload request for the corresponding offload request has not been transmitted), the valid bit is set to '1'; otherwise, the bit in the valid bit field 360 is set to '0' and thus the entry may be cleared.

Returning to FIG. 1, in some examples, after an offload request is issued by a processor core 106, 108, 110, 112, the offload request is received by the coherency synchronizer 136. The coherency synchronizer 136 performs cache operation on the various caches of the core complexes 102, 104 to ensure that any cache entries for virtual and/or physical addresses identified in the offload request remain coherent. For example, when an offload request includes as an operand a physical address, the coherency synchronizer 136 performs a cache probe to identify cache entries in the L1, L2, and L3 caches of the core complex that contain cache entries for the physical address identified in the offload request. If the identified cache entry contains clean data, the cache entry is invalidated. If the identified cache entry contains dirty data, the data in the cache entry is flushed to main memory (i.e., the memory device). In some examples, cache entries corresponding to physical addresses identified in the offload request issued by a particular core in a core complex may be invalidated/flushed before reaching the coherency synchronizer 136, such that the coherency synchronizer 136 performs the cache probe only on other core complexes in the processor 101. In other examples, the coherency synchronizer 136 receives the offload request directly and performs the cache probe on all core complexes in the processor 101. Barrier instructions (discussed below) at the beginning and end of the offload transaction may be employed to ensure that younger non-offload instructions in the instruction queue do not access any cache entries for virtual and/or physical addresses identified in the offload request(s) until those cache entries have been invalidated or flushed. In this way, the younger non-offload instructions are prevented from accessing stale cache data and must instead retrieve the data from main memory (which may have been modified by a prior offload request). After the appropriate cache operations have completed, the offload request is transmitted to the memory controller 134 for offloading to the offload target device. The operation of the coherency synchronizer will be described in greater detail below.

In some implementations, the memory controller 134 receives the offload requests, which may be configured as I/O requests (e.g., a write request) with a flag that indicates the I/O request is an offload request. In these implementations, the memory controller 134 decodes the request to determine that the request is an offload request and identifies the offload instruction as well as operands for completing the offload request. The memory controller 134 identifies the requested operation via a pointer to a command buffer located in the offload target device from the offload request. The memory controller 134 breaks the offload request into one or more commands that are transmitted to the offload target device. In examples where the target device is a PIM device, the request may be a PIM request that is broken into one or more PIM commands by the memory controller 134.

In the example depicted in FIG. 1, the processor 101 is coupled to a memory device 138 that includes one or more memory arrays 142 for storing data. In some examples, the memory device 138 is a stacked dynamic random-access memory (DRAM) device that includes multiple memory dies stacked on a memory interface logic die that interfaces with the processor 101. For example, the memory device 138 may be a high bandwidth memory (HBM) module or a hybrid memory cube (HMC) module. In these examples, the HBM module may be integrated in an SoC with the processor 101 or coupled to the processor 101 through an interposer. In other examples, the memory device 138 may be an in-line memory module such as a dual in-line memory module (DIMM) that includes memory interface logic. The memory controller 134 issues commands to the memory logic 140 of the memory device 138, such as read requests, write requests, and other memory operations. In some implementation, commands transmitted to the memory device 138 by the memory controller 134 may be flagged as offload commands.

In some embodiments, the memory device 138 includes a processing-in-memory (PIM) device in that the memory logic 140 is designed to perform memory operations and a set of non-memory operations or functions (e.g., arithmetic and logical operations) within the memory device 138. In these implementations, the memory device 138 includes a separate register file 144 that may be used to provide operands to operate on by the functions.

In embodiments where the offload target is the memory device 138, and where the memory device contains a PIM device, the memory device 138 receives offload commands generated from the offload requests from the memory controller 134 of the processor 101. In the example depicted in FIG. 1, the memory logic 140 is coupled to fixed function module 146 for implementing fixed functions identified in a PIM request. The fixed function module 146 may include a command buffer that is populated with the actual commands to be executed by the fixed function module 146 by an operating system after a thread containing the offload instruction is launched.

In some examples, the coherency synchronizer 136 and memory controller 134 may be implemented on an I/O die 150 that is distinct from dies 154, 156 implementing the core complexes 102, 104. The I/O die 150 may be coupled through one or more channels to a memory interface die (not shown) of the memory device 138 that includes the memory logic 140 and the register file 144. One or more memory dies each including a memory array 142 may be stacked on top of the memory interface die and coupled to the memory interface die using through-silicon vias. The I/O die 150 may be coupled to the core complex dies 154, 156 through an on-chip fabric. In various examples, the memory device 138 is a remote execution device in that execution logic for executing PIM offload instructions is not part of any processor core. For example, the memory device 138 may be implemented on the same chip or in the same package as the processor cores 106, 108, 110, 112 while remaining "remote" from the processor 101 with respect to execution locality. In some examples, the processor 101 and the memory device 138 of the system 100 are integrated on the same chip (e.g., an SoC). In other examples, the system 100 implements a system-in-package (SiP) architecture in which the processor 101 and its components (e.g., as an SoC) are placed on an interposer wafer along with the memory device 138 in the same semiconductor package. While the example system 100 is described as including processor dies 154, 156, the I/O die 150, and one or more dies of the memory device 138, readers will appreciate that the system may be implemented by more or fewer dies, and that components thereof may be integrated or distributed across any number of dies.

Figure 4:
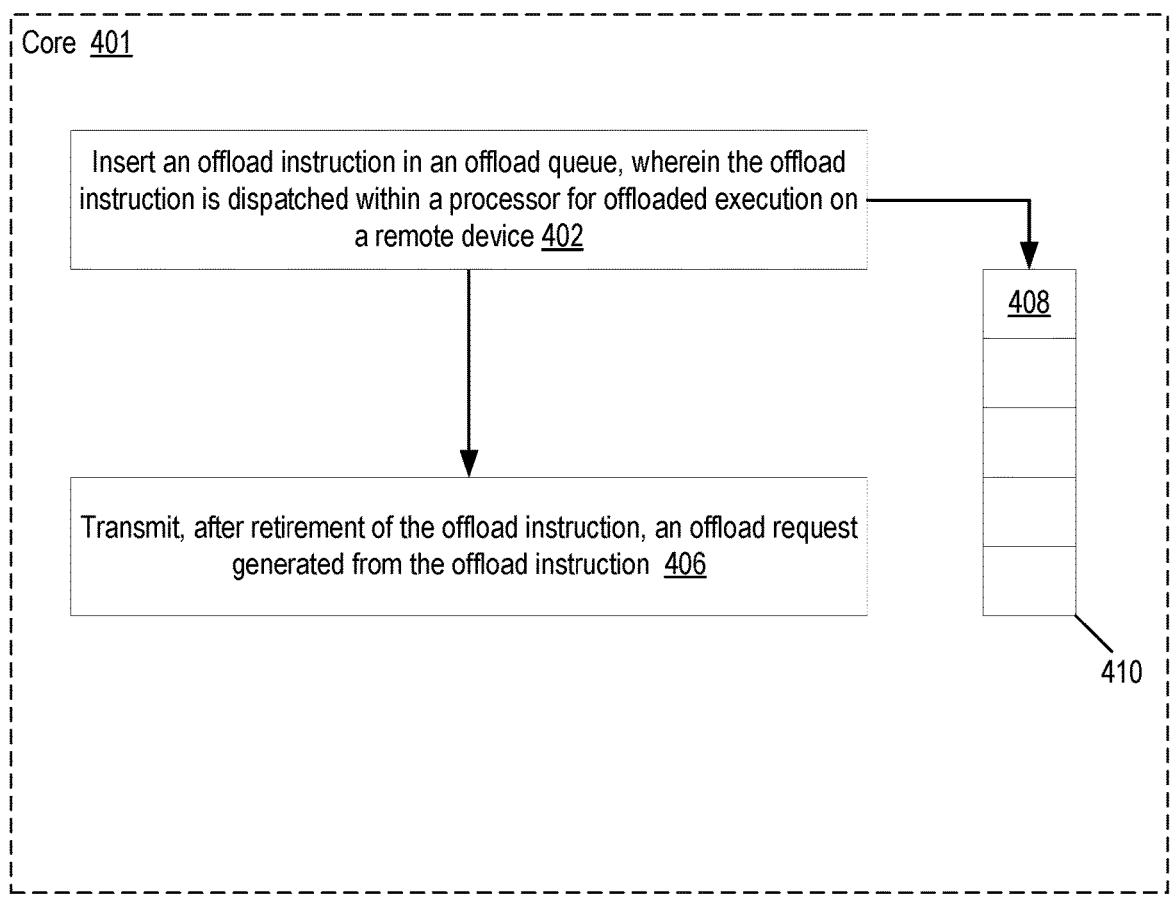
FIG. 4 sets forth a flow chart illustrating another example method of offloading computations from a processor to remote execution logic in accordance with embodiments of the present disclosure.

For further explanation, FIG. 4 sets forth a flow chart illustrating an exemplary method for offloading computations from a processor to remote execution logic according to embodiments of the present disclosure. The exemplary method of FIG. 4 includes inserting 402 an offload instruction in an offload queue, wherein the offload instruction is dispatched within a processor for offloaded execution on a remote device. As previously discussed, offload instructions for offloaded execution on a remote device pass through the front end of the core (instruction fetch, decode, etc.) like conventional instructions before being dispatched, at a dispatch stage of the pipeline, to the back end of the core for instruction execution. Upon dispatch, offload instructions, like conventional instructions, undergo memory address generation for memory operands and memory violation checks with respect to older instructions. While offload instructions get picked for execution by the scheduler, they do not actually execute on the core's ALUs. Moreover, architected remote registers in offload instructions do not occupy space in the core's physical register file. When memory address generation has completed (for remote_load/store operations) and source operands computed from older non-offload instructions are available (for remote computation), the offload instruction is ready to retire upon being picked for execution. That is, no data is sent or received from memory and no results are written to the core's register file. Rather, an offload instruction triggers the generation of an offload request for the offload target device. The offload queue is employed to maintain dependencies among offload instructions in an out-of-order, multiple issue CPU.

In some implementations, inserting 402 an offload instruction in an offload queue is carried out by creating an entry (408) for the offload instruction (e.g., a remote_load, remote_store, or remote_op instruction) in an offload queue 410 of a core 401 using a unique identifier for the offload instruction. For example, the unique identifier may be the ROB ID as discussed above. In some examples, inserting 402 an offload instruction in an offload queue is carried out in the dispatch stage, as detailed below in the discussion of FIG. 5. In other examples, inserting 402 an offload instruction in an offload queue is carried out in the retire stage, as detailed below in the discussion of FIG. 6. The offload queue 410 may be an offload queue such as the offload queues 160, 162, 164, 166, and the core 401 may be a core such as the cores 106, 108, 110, 112, that are depicted in FIG. 1.

The method of FIG. 4 also includes transmitting 406, after retirement of the offload instruction, an offload request generated from the offload instruction. After the offload instruction has retired, the offload instruction and any dependent offload instructions are guaranteed to "issue" in program order (i.e., there were no pipeline flushes and speculations were correct). While no actual operation is performed by the offload instruction, its retirement indicates that an offload request triggered by the offload instruction can be transmitted without violating memory ordering with respect to older instructions. In some examples, transmitting 406, after retirement of the offload instruction, an offload request generated from the offload instruction is carried out by generating an offload request from the offload instruction, including the opcode for remote execution, destination operand and source operand(s) (including generated memory addresses and register values from the metadata). For example, the offload request may be a request packet. In some examples, when the offload instruction is part of an offload transaction, the offload requests corresponding to each offload instruction in the offload transaction may be held until the end of the transaction is reached (e.g., by retiring a transaction end instruction). In other words, the offload queue may include entries for each offload instruction in an offload transaction. When the end of the offload transaction is reached, an offload request is transmitted for each entry in the offload queue. In this way, offload requests are guaranteed to issue in program order, such that offload commands are received by the offload target device in program order. In some examples, transmitting 406, after retirement of the offload instruction, an offload request generated from the offload instruction is carried out by transmitting the offload request to the coherency synchronizer 136 and/or the memory controller 134.

Figure 5:
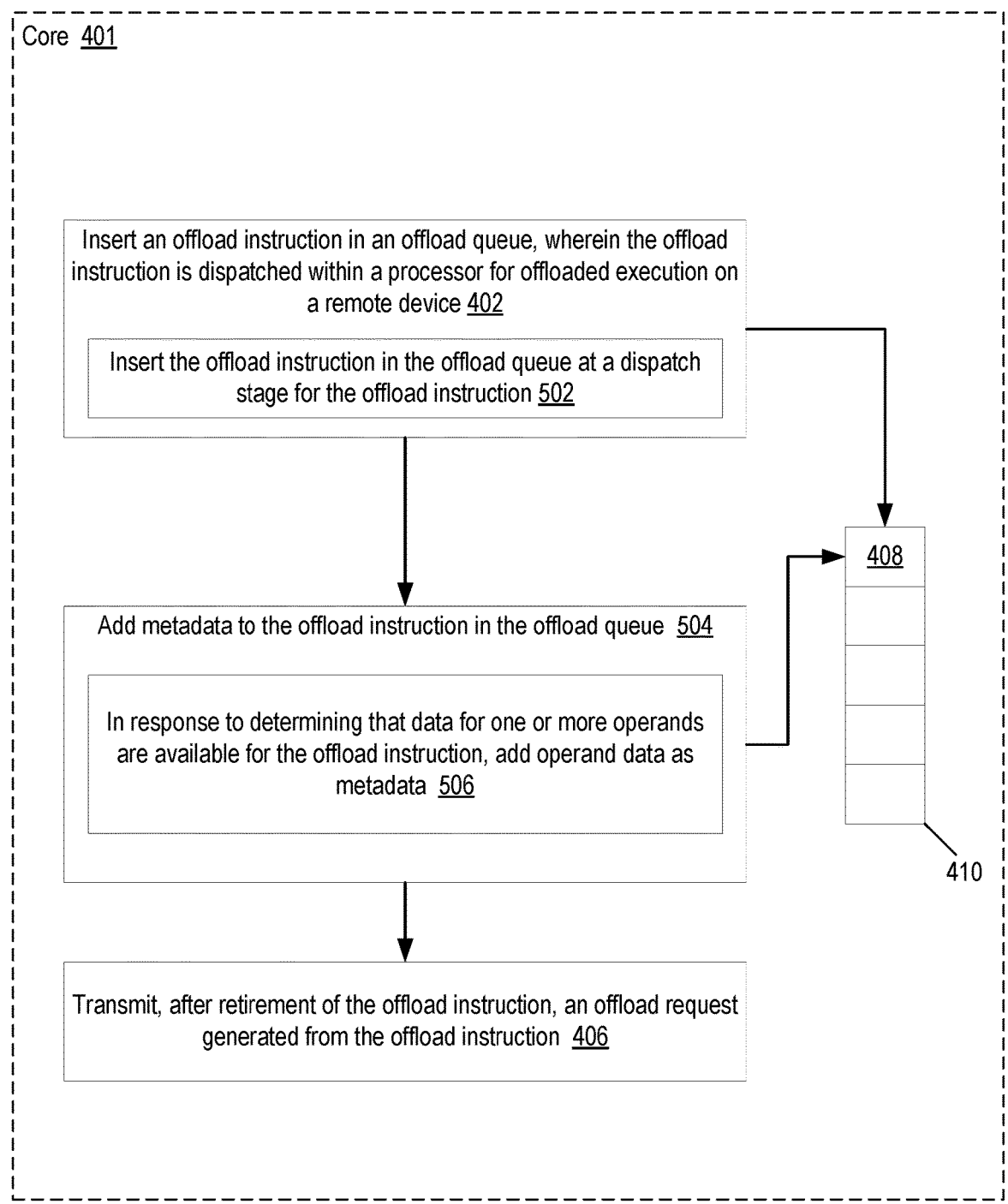
FIG. 5 sets forth a flow chart illustrating another example method of offloading computations from a processor to remote execution logic in accordance with embodiments of the present disclosure.

For further explanation, FIG. 5 sets forth a flow chart illustrating an exemplary method for offloading computations from a processor to remote execution logic according to embodiments of the present disclosure. Like the method of FIG. 4, the method of FIG. 5 also includes inserting 402 an offload instruction in an offload queue, wherein the offload instruction is dispatched within a processor for offloaded execution on a remote device; and transmitting 406, after retirement of the offload instruction, an offload request generated from the offload instruction.

In the method of FIG. 5, inserting 402 an offload instruction in an offload queue includes inserting 502 the offload instruction in the offload queue at a dispatch stage for the offload instruction. In some examples, inserting 502 the offload instruction in the offload queue at a dispatch stage for the offload instruction is carried out by creating the entry 408 for the offload instruction in the offload queue 410 as part of dispatching the offload instruction from the front end of the core to the execution unit(s). In these examples, creating the entry 408 in the offload queue 410 as part of dispatching the offload instruction from the front end of the core to the execution unit(s) may include populating the entry 408 with information that is known at instruction dispatch, such as the ROB ID of the offload instruction, opcode, thread identifier, and the PRN of the architected register to which a source operand is mapped. If source operand values are already available in the physical register file, those values may be read and populated in the entry 408 as part of creating the entry 408.

The method of FIG. 5 also includes adding 504 metadata to the offload instruction in the offload queue. In some examples, adding 404 metadata to the offload instruction in the offload queue is carried out by adding a memory address generated from a memory operand or a value for a source operand that is the computational result of an older conventional instruction to a field of the offload queue entry 408 for the offload instruction. For example, the metadata may be added to an offload queue entry formatted like the offload queue entry 200 of FIG. 2 or the offload queue entry 300 of FIG. 3.

In some implementations, adding 504 metadata to the offload instruction in the offload queue includes, in response to determining that data for one or more operands are available for the offload instruction, adding 506 operand data as metadata. After the offload instruction is dispatched, memory addresses generated for memory operands (e.g., in offloaded load/store instructions) may not be ready; likewise, source operands computed from older instructions may not be available yet. Until memory operand data and source operand data becomes available, the dispatched offload instruction waits in an instruction queue or reservation station just like non-offload instructions. In some examples, adding 506 operand data as metadata in response to determining that data for one or more operands are available for the offload instruction is carried out by determining that a memory address for a memory operand has been generated and populating the entry 408 in the offload queue 410 with the generated memory address as metadata for the offload instruction. In some examples, adding 506 operand data as metadata in response to determining that data for one or more operands are available for the offload instruction is carried out by determining that a value for a source operand has become available in the physical register file and populating the entry 408 in the offload queue 410 with the source operand value as metadata for the offload instruction.

In some implementations, determining that data for one or more operands are available for the offload instruction is carried out by the AGU forwarding a calculated memory address to the offload queue 410 and populating the address field of the entry 408 with the memory address. In some implementations, determining that data for one or more operands are available for the offload instruction is carried out by an ALU forwarding an operand value with its PRN to the offload queue when the operand value and PRN are forwarded to the reservation station. For all entries in the offload queue that include the PRN of the broadcasted operand value, the operand field corresponding to the PRN is updated with the operand value. In some implementations, determining that data for one or more operands are available for the offload instruction is carried out by picking the offload instruction for execution and populating the entry 408 with source operand values from the reservation station by mapping the ROB ID of the offload instruction in the reservation station to the ROB ID of the entry 408 in the offload queue. In such an implementation, the entry 408 may omit the field for the PRN. In all of these implementations, memory addresses for memory operands are available and source operand values have been computed and are available in the physical register file or through a bypass network.

Figure 6:
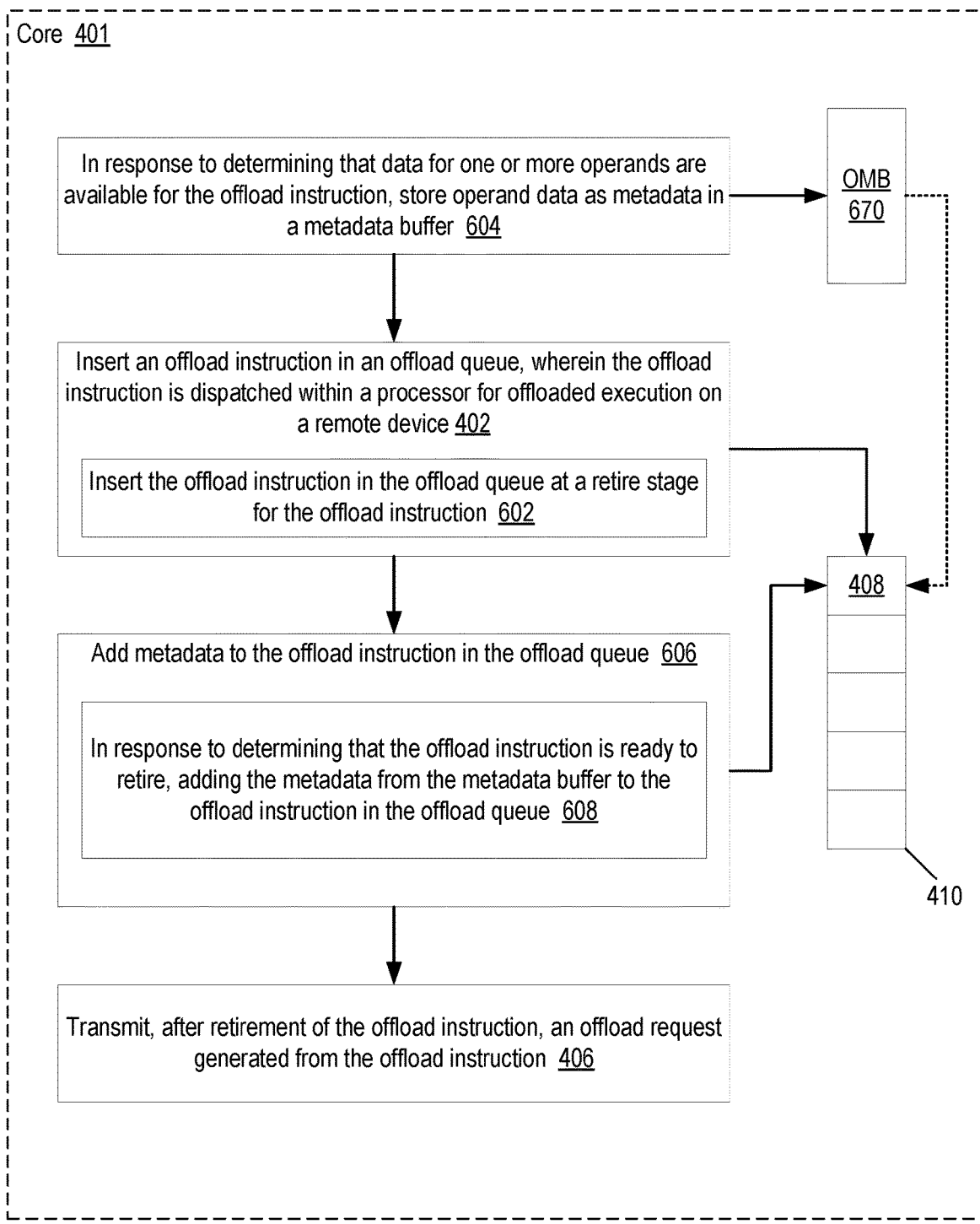
FIG. 6 sets forth a flow chart illustrating another example method of offloading computations from a processor to remote execution logic in accordance with embodiments of the present disclosure.

For further explanation, FIG. 6 sets forth a flow chart illustrating an exemplary method for offloading computations from a processor to remote execution logic according to embodiments of the present disclosure. Like the method of FIG. 4, the method of FIG. 6 also includes inserting 402 an offload instruction in an offload queue, wherein the offload instruction is dispatched within a processor for offloaded execution on a remote device; and transmitting 406, after retirement of the offload instruction, an offload request generated from the offload instruction.

In the method of FIG. 6, inserting 402 an offload instruction in an offload queue includes inserting 602 the offload instruction in the offload queue at a retire stage for the offload instruction. In some examples, inserting 602 the offload instruction in the offload queue at a retire stage for the offload instruction is carried out by creating the entry 408 in the offload queue 410 after the offload instruction has executed and moved into the retire queue or reorder buffer. That is, after execution but before the offload instruction has retired or committed, the entry 408 is created in the offload queue 410. In some implementations, the opcode and thread identifier are copied to the entry 408 from the retire queue or reorder buffer in program order. Additional metadata for the offload instruction is added to the entry 408 from other core resources either concurrent with or immediately following the creation of the entry 408, as explained further below.

The method of FIG. 6 also includes, in response to determining that data for one or more operands are available for the offload instruction, storing 604 operand data as metadata in a metadata buffer. As discussed above, before the offload instruction is picked for execution, memory addresses are generated for memory operands (e.g., in offloaded load/store instructions); likewise, source operands computed from older instructions are made available in the physical register file. When memory operand data and source operand data become available, because the offload entry 408 is not created until the retire stage, metadata for the memory operand and source register values are stored in an offload metadata buffer 670 (e.g., the offload metadata buffer 170, 172, 174, 176 of FIG. 1). In some examples, storing 604 operand data as metadata in a metadata buffer is carried out by determining that a memory address for a memory operand has been generated and storing the generated memory address with ROB ID of the offload instruction in the offload metadata buffer 670. In some examples, storing 604 operand data as metadata in a metadata buffer is carried out by determining that a value for a source operand has become available in the physical register file and storing the source operand value with the ROB ID of the offload instruction in the offload metadata buffer 670.

The method of FIG. 6 also includes adding 606 metadata to the offload instruction in the offload queue. In some examples, adding 606 metadata to the offload instruction in the offload queue is carried out by adding a memory address generated from a memory operand or a value for a source operand that is the computational result of an older conventional instruction to a field of the offload queue entry 408 for the offload instruction. For example, the metadata may be added to an offload queue entry formatted like the offload queue entry 200 of FIG. 2 or the offload queue entry 300 of FIG. 3.

In some implementations, adding 606 metadata to the offload instruction in the offload queue includes, in response to determining that the offload instruction is ready to retire, adding 608 the metadata from the metadata buffer to the offload instruction in the offload queue. In some examples, the offload instruction is ready to retire when memory addresses for memory operands have been generated, source operand values in physical registers are available, and memory order violations have been checked. In these examples, the offload instruction may retire when the offload instruction is the oldest instruction in the retire queue or reorder buffer. In some implementations, at retire time, the ROB ID of the offload instruction is used to CAM the offload metadata buffer 670 to identify memory addresses for memory operands and values for source operands that were stored in the metadata buffer 670. In these implementations, adding 60 the metadata from the metadata buffer to the offload instruction in the offload queue is carried out by copying metadata from the metadata buffer 670 corresponding to the ROB ID of the offload instruction into the entry 408 for the offload instruction in the offload queue 410. For example, a memory address associated with an ROB ID of a particular offload instruction stored in the metadata buffer 670 is copied into the memory address field of the entry for that offload instruction in the offload queue, and so on. In some examples, adding 608 the metadata from the metadata buffer to the offload instruction in the offload queue may be performed concurrently with or as part of inserting 602 the offload instruction in the offload queue at a retire stage for the offload instruction.

In view of the above description, readers will appreciate the embodiments in accordance with the present disclosure provide numerous advantages. Reader will appreciate that these embodiments provide support for out-of-order, multiple issue CPU cores to offload computations to a target device such as a PIM device, accelerator, or other CPU-guided target device. Embodiments in accordance with the present disclosure reduce the complexity and overhead of offloading instructions by enabling instructions to be offloaded to a target device assuming cacheable, coherent data and without launching any additional threads. These embodiments require no changes to the threading model of an application and enable the application to perform fixed function computations on cacheable data without necessitating software cache management. Readers will appreciate that the architecture disclosed here, through the use of a queue structure, ensures that offload requests are transmitted to a remote execution device in order despite out-of-order instruction handling in the CPU core, while maintaining the integrity of data dependencies.

Embodiments can be a system, an apparatus, a method, and/or logic circuitry. Computer readable program instructions in the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions.

Aspects of the present disclosure are described herein with reference to flowchart illustrations and/or block diagrams of methods, apparatus (systems), and logic circuitry according to some embodiments of the disclosure. It will be understood that each block of the flowchart illustrations and/or block diagrams, and combinations of blocks in the flowchart illustrations and/or block diagrams, can be implemented by logic circuitry.

The logic circuitry may be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and logic circuitry according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to embodiments thereof, it will be understood that various changes in form and details may be made therein without departing from the spirit and scope of the following claims. Therefore, the embodiments described herein should be considered in a descriptive sense only and not for purposes of limitation. The present disclosure is defined not by the detailed description but by the appended claims, and all differences within the scope will be construed as being included in the present disclosure.

What is claimed is:

1. A method comprising:
inserting, at one of a dispatch stage and a retire stage of an offload instruction, an entry for the offload instruction in an offload queue used for offloading operations from a processor to one or more processing-in-memory (PIM) devices;
adding metadata to the entry for the offload instruction in the offload queue; and
transmitting, after retirement of the offload instruction, an offload request generated from the entry for the offload instruction.

2. The method of claim 1, wherein the entry for the offload instruction is inserted in the offload queue at the dispatch stage for the offload instruction.

3. The method of claim 2, wherein adding metadata to the entry for the offload instruction in the offload queue includes adding operand data as metadata.

4. The method of claim 1, the entry for the offload instruction is inserted in the offload queue at the retire stage for the offload instruction.

5. The method of claim 4 further comprising:
in response to determining that data for one or more operands are available for the offload instruction, storing operand data as metadata in a metadata buffer;
wherein adding metadata to the entry for the offload instruction in the offload queue includes, in response to determining that the offload instruction is ready to retire, adding the metadata from the metadata buffer to the entry for the offload instruction in the offload queue.

6. The method of claim 1, wherein a memory address is added as metadata to the entry for the offload instruction in the offload queue.

7. The method of claim 1, wherein a value for a source operand of the offload instruction that is computed by a non-offload instruction is added as metadata to the entry for the offload instruction in the offload queue.

8. The method of claim 1, wherein the offload instruction is included in a plurality of associated offload instructions; and wherein the offload request is transmitted after all offload instructions of the plurality of associated offload instructions have retired.

9. The method of claim 1, wherein the offload queue maintains a program order of a plurality of associated offload instructions.

10. A processor comprising:
an offload queue for offloading operations from the processor to one or more processing-in-memory (PIM) devices; and
a processor core configured to:
insert an entry for an offload instruction in the offload queue at one of a dispatch stage and a retire stage of an offload instruction;
add metadata to the entry for the offload instruction in the offload queue; and
transmit, after retirement of the offload instruction, an offload request that is generated from the entry for the offload instruction.

11. The processor of claim 10, wherein the entry for the offload instruction is inserted in the offload queue at a dispatch stage for the offload instruction.

12. The processor of claim 11, wherein adding the metadata to the entry for the offload instruction includes adding operand data as metadata.

13. The processor of claim 10, wherein the entry for the offload instruction is inserted in the offload queue at a retire stage for the offload instruction.

14. The processor of claim 13, wherein the processor core is further configured to:
in response to determining that data for one or more operands are available for the offload instruction, store operand data as metadata in a metadata buffer;
wherein adding metadata to the entry for the offload instruction in the offload queue includes, in response to determining that the offload instruction is ready to retire, adding the metadata from the metadata buffer to the entry for the offload instruction in the offload queue.

15. The processor of claim 10, wherein a memory address is added as metadata to the entry for the offload instruction in the offload queue.

16. The processor of claim 10, wherein a value for a source operand of the offload instruction that is computed by a non-offload instruction is added as metadata to the entry for the offload instruction in the offload queue.

17. A system comprising:
one or more processing-in-memory (PIM) devices; and
a processor coupled to the one or more PIM devices, the processor configured to:
insert, at one of a dispatch stage and a retire stage of an offload instruction, an entry for the offload instruction in an offload queue used for offloading operations from the processor to the one or more PIM devices;
add metadata to the entry for the offload instruction in the offload queue; and
transmit, after retirement of the offload instruction, an offload request that is generated from the entry for the offload instruction.

18. The system of claim 17, wherein the entry for the offload instruction is inserted in the offload queue at a dispatch stage for the offload instruction.

19. The system of claim 18, wherein adding the metadata to the entry for the offload instruction includes adding operand data as metadata.

20. The system of claim 17, wherein the entry for the offload instruction is inserted in the offload queue at the retire stage for the offload instruction; and
wherein the processor is further configured to:
in response to determining that data for one or more operands are available for the offload instruction, store operand data as metadata in a metadata buffer;
wherein adding metadata to the entry for the offload instruction in the offload queue includes, in response to determining that the offload instruction is ready to retire, adding the metadata from the metadata buffer to the entry for the offload instruction in the offload queue.

* * * * *